United States Patent

[11] 3,540,512

| [72] | Inventors | John F. Heimovics, Jr.<br>Stow;<br>James Sidles, West Richfield, Ohio |
|------|-----------|---|
| [21] | Appl. No. | 693,510 |
| [22] | Filed | Dec. 26, 1967 |
| [45] | Patented | Nov. 17, 1970 |
| [73] | Assignee | The B. J. Goodrich Company<br>New York, New York<br>a corporation of New York |

[54] PNEUMATIC TIRE
4 Claims, 5 Drawing Figs.

[52] U.S. Cl. .................................................. 152/359,
152/356, 156/133
[51] Int. Cl. .................................................. B60c 9/06,
B29h 17/14
[50] Field of Search .......................................... 152/359,
356

[56] References Cited
UNITED STATES PATENTS
3,217,778  11/1965  Kovac .......................... 152/359

Primary Examiner—Arthur L. La Point
Assistant Examiner—Robert Saifer
Attorneys—W. A. Shira, Jr. and H. S. Meyer ABSTRACT: A pneumatic tire with reinforcing cords of stretchable material embedded therein, the cords having initially a low tensile modulus and upon elongation a predetermined and limited amount abruptly changing to a substantially higher tensile modulus with each cord extending continuously from one bead of the tire to the opposite bead and intersecting the plane of symmetry of the tire at an acute angle.

Patented Nov. 17, 1970
3,540,512
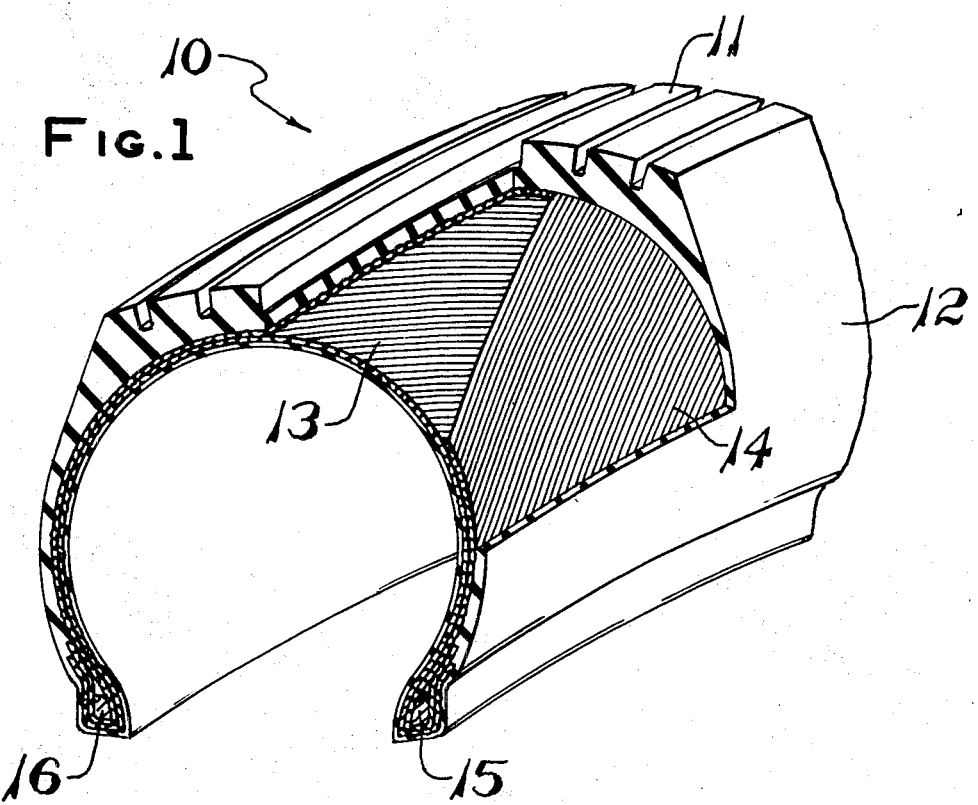
Fig. 1
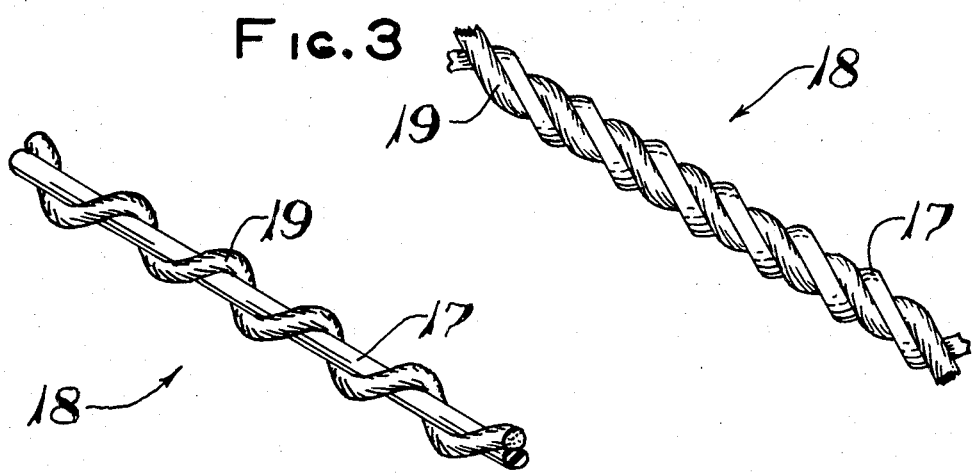
Fig. 3
Fig. 2
INVENTORS
JOHN F. HEIMOVICS, JR.
JAMES SIDLES
BY W. A. Shira, Jr.
ATTY.

Patented Nov. 17, 1970

INVENTORS
JOHN F. HEIMOVICS, JR.
JAMES SIDLES
BY W. A. Shira Jr.
ATTY.

PNEUMATIC TIRE

BACKGROUND OF THE INVENTION

In the manufacture of pneumatic vehicle tires it is common practice to fabricate the uncured carcass on a collapsible building drum. The plies of cord reinforced elastomer are wrapped around the drum in superposed relationship such that the reinforcing cords in each ply interconnect spaced beads placed on the drum ends and make an acute angle with a plane perpendicular to the drum axis at the midpoint. The uncured elastomeric tread stock is then applied circumferentially on the carcass and the assembled, uncured tire is thereafter removed from the building drum usually by use of an internal collapsing mechanism, then expanded to a generally toroidal configuration and vulcanized in a mold. Furthermore, by pantograph action the reinforcing cords shift in the uncured rubber in order to assume a position of least strain to permit proper shaping of the carcass when the tire is in the expanded configuration. When a tire is overloaded by the vehicle, at any given inflation pressure for the design load, severe radial deflection occurs in the portion of the tread in contact with the ground. In view of the pantographic arrangement of the reinforcing cords, excessive radial deflection in the portion of the tire in contact with the ground causes the cords to be loaded compressively which in turn results in cord buckling. Buckling of the reinforcing cords causes more severe stress cycling in the cords and often premature failure of the tire.

SUMMARY OF THE INVENTION

The present invention solves the above-described problem of buckling of the reinforcing cords when the tire is severely deflected radially from overloading by providing in the tire reinforcing cords having initially a low modulus of elongation and upon elongation of a predetermined limited amount, abruptly changing to a higher modulus of elongation. The stretchable reinforcing cords are characterized by at least one textile yarn wrapped helically around a prevulcanized elastomeric core in openly spaced coiled arrangement.

The tire is vulcanized with the reinforcing cords elongated in the region of lower tensile modulus. Upon inflation, the tire expands to full toroidal configuration in which the stretchable cords are elongated past the point of transition to the region of higher tensile modulus. Thus the cords are rendered substantially inextensible when the tire is vulcanized and in an inflated state. When the tire is overloaded for any given inflation pressure, thereby causing severe local radial deflection of the tread, the cords in adjacent portion sidewalls are no longer loaded in tension sufficient to maintain the cord beyond the point of modulus transition; therefore, some of the unloaded cords reenter the region of low modulus of elongation. In the low tensile modulus region, the cords are capable of contracting substantially to prevent buckling of the tire sidewalls under the overload conditions. The present invention thus comprises a tire having stretchable reinforcing cords which are inextensible in the vulcanized inflated state, but which have the ability to contract for eliminating buckling when the tire is severely deflected.

BRIEF DESCRIPTION OF THE DRAWING

FIG. 1 is an isometric view of a portion of the tire with the tread and sidewall partially broken away to show the reinforcing cords.

FIG. 2 is an enlarged view of a portion of the stretchable reinforcing cord and is shown in the unstretched state.

FIG. 3 is a view similar to FIG. 2 with the cord shown elongated beyond the point of transition to the higher tensile modulus.

DETAILED DESCRIPTION

Figure 4:
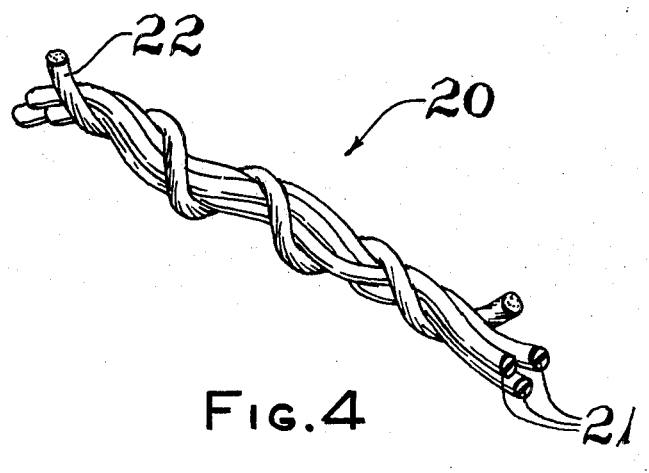
FIG. 4 is a perspective view of the stretchable cord in another embodiment having a stranded core.

Referring now to FIG. 1, the tire 10 is shown in the presently preferred embodiment in the vulcanized and inflated state with the tread 11 and sidewall 12 broken away to expose the reinforcing cord plies. Preferably, these are at least two layers, 13 and 14 of reinforcing cords which extend continuously in oblique arrangement from one bead core 15 to the opposite bead core 16, with adjacent superposed layers having the cords intersecting the axial plane of symmetry of the tire at equal but opposite acute angles.

The incorporation of elastically distensible reinforcing cords which undergo a transition from a low tensile modulus to a substantially higher tensile modulus becoming thereafter substantially inextensible, enables the tire of the present invention to be vulcanized partially "lifted" or shaped, and then expanded to full toroidal shape upon being inflated and to be thereafter inextensible. The cord used in building the carcass may be stretched a predetermined amount in the range 30—70 percent of its initial length. In the preferred form of the invention, the reinforcing cord has a core of prevulcanized elastomer with textile yarn wrapped helically around the core.

Figure 5:
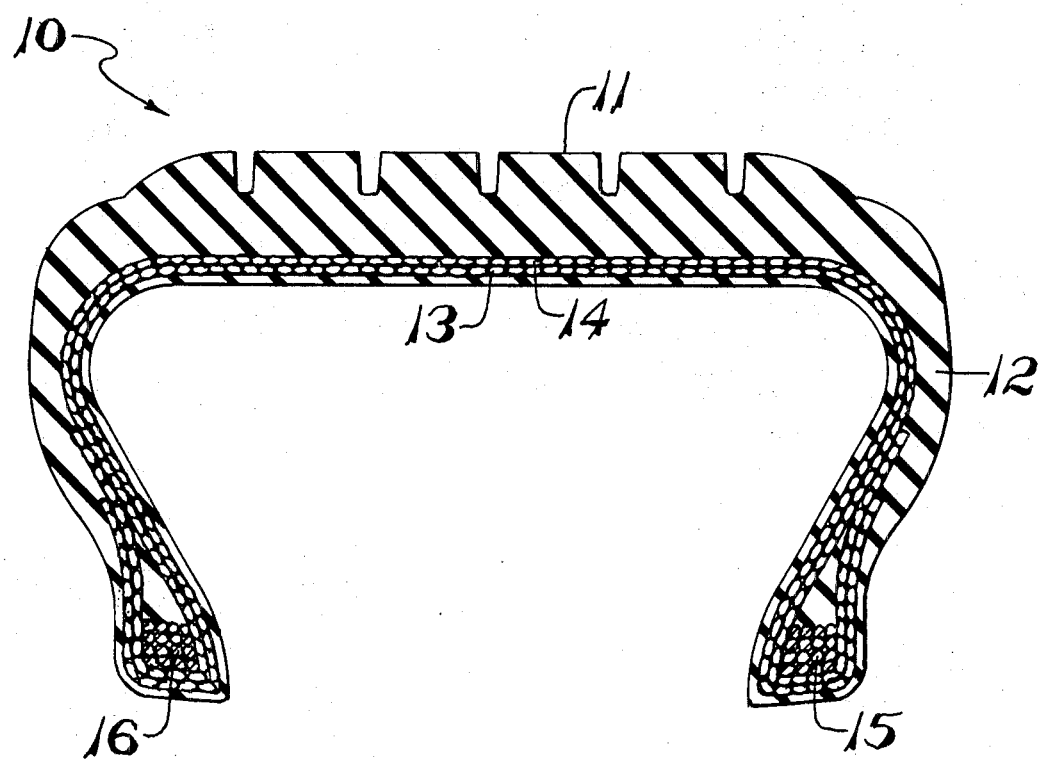
FIG. 5 is a cross-sectional view of the tire in the preferred embodiment as it appears in the vulcanized state.

The tire is built in flat-band form on a conventional tire-building drum; for passenger car tires, the drum thereover plies of elastomeric material having the stretchable reinforcing cords therein has a diameter generally that of the beads. If desired for tubeless inflation of the completed tire, an air-impervious liner ply may be applied initially to the building drum before applying the uncured carcass plies. The assembled uncured carcass is then removed from the building drum, expanded to a partially toroidal configuration and vulcanized in this state. The vulcanized tire when inflated is expanded to the full toroidal configuration shown in FIG. 1 primarily by elongation of the stretchable cords upon inflation. FIG. 5 shows the tire as it appears in the vulcanized state prior to inflation. The tire as shown in FIG. 5 is only partially expanded to the full toroidal configuration. In the preferred practice of the present invention the tread diameter of the vulcanized tire is expanded 25—30 percent from the vulcanized to the inflated diameter; however, the amount of expansion of the vulcanized tire is not limited to that of the preferred form and may expand any amount in the range 15—40 percent of the vulcanized diameter.

Referring to FIG. 2, the reinforcing cord 18 is shown in an enlarged view of a portion of the cord. The cord is shown in FIG. 2 as it appears in the relaxed state, prior to expansion and vulcanization of the tire carcass. The carcass employs a cord 18 having a core 17 of preferably prevulcanized elastomeric material with at least one yarn 19 of substantially inextensible textile material wrapped helically around the core 17 in openly spaced coiled arrangement. The preferred embodiment of the tire employs cords as shown in FIG. 2 and 3 and the cord made as set forth in U.S. Pat. No. 3,455,100, July 15, 1969, entitled "Reinforcement for Elastomeric Articles".

Referring now to FIG. 3, the preferred form of the cord 18 is shown as it appears when the tire in which it is incorporated is in the vulcanized and inflated state with cord having passed the point of transition to the higher tensile modulus region. In the elongated state, the cord, as shown in FIG. 3, has the helically wound textile yarn 19 disposed in substantially less of a helix and more nearly linear than in the unstretched state, with the elastomeric core 17 squeezed out between the stretched coils of the yarn to a position radially outward of the diameter of the yarn and disposed spirally therearound. The elastomeric core 17 makes a negligible contribution to the overall modulus of elongation after the transition point has been reached.

Another form of the cord is shown in FIG. 4 having a multiple stranded core. The core 21 is formed by a plurality, preferably three, of elastomeric filaments pretwisted together and the yarn 22 wrapped helically therearound in the opposite sense from the core 22.

The invention thus comprises a pneumatic tire having initially stretchable low-tensile modulus reinforcing cords, which upon elongation a predetermined and limited amount, pass through an abrupt transition to have a substantially higher modulus of elongation. The tire carcass is vulcanized while only partially lifted from the building drum and by virtue of the stretchability of the reinforcing cords, expands upon inflation to the full toroidal shape, further expansion thereafter being prevented by simultaneous transition of the cords to the state of higher tensile modulus. The tire of the present invention may thus be inflated to the full diameter and then subjected to loads sufficient to cause severe deflection of the tire, the deflection being absorbed without damage to the carcass by virtue of the stretchable cords contracting to the low modulus state in the region of severe tire deflection. Severe local radial deflection of the tire tread is thereby absorbed by contraction of the stretchable cords into the region of low-tensile modulus.

Modifications and adaptations may be made within the purview of the invention by those having ordinary skill in the art and the invention is more particularly defined by the appended claims.

We claim:

1. A pneumatic tire of cord reinforced elastomeric material having a carcass surmounted by a tread and terminating in spaced beads, characterized in that said tire has:
   a. at least two plies of elastomer reinforced with bias cords of limited but predetermined stretchability;
   b. its inflated diameter greater than its vulcanized diameter by an amount in the range of 15—40 percent; and
   c. said reinforcing cords have:
      i. a core of prevulcanized elastomeric material; and
      ii. at least one substantially inextensible textile yarn wrapped helically around said core with the said yarn disposed in equally spaced open coil arrangement when the cord is in the relaxed condition, such that said reinforcing cords are substantially elastically extensible with the tire in the vulcanized state prior to inflation, said cords being distensible upon tire inflation and substantially inextensible with the tire in the inflated state.

2. A tire as defined in claim 1, wherein the core of each of said stretchable cords comprises a plurality of strands of prevulcanized elastomeric material twisted together.

3. A tire as defined in claim 1 wherein the core of each of said cords consists of three filaments of prevulcanized elastomeric material twisted together.

4. A tire as defined in claim 1, wherein said cords are capable of stretching an amount in the range 30—70 percent of their initial length.